United States Patent [19]

Leffew

[11] Patent Number: 5,176,859
[45] Date of Patent: Jan. 5, 1993

[54] APPARATUS/AND METHOD FOR CONTROLLING AN INJECTION MOLDING PROCESS PRODUCING A MOLDED PART

[75] Inventor: Kenneth W. Leffew, Kennett Square, Pa.

[73] Assignee: Philips and Du Pont Optical Company, Wilmington, Del.

[21] Appl. No.: 803,662

[22] Filed: Dec. 2, 1991

Related U.S. Application Data

[63] Continuation of Ser. No. 447,982, Dec. 8, 1989, abandoned.

[51] Int. Cl.$^5$ .............................................. B29C 45/77
[52] U.S. Cl. ................................ 264/40.5; 264/328.7; 264/328.11; 425/145; 425/149; 425/150; 425/156; 425/167; 425/590
[58] Field of Search ................... 264/40.1, 40.5, 328.1, 264/328.7, 328.11; 425/135, 145, 146, 149, 150, 155, 156, 160, 167, 589, 590

[56] References Cited

U.S. PATENT DOCUMENTS

| | | | |
|---|---|---|---|
| 3,632,729 | 1/1972 | Bielfeldt | 264/294 |
| 3,857,658 | 12/1974 | Muzsnay | 425/150 |
| 3,940,465 | 2/1976 | Hauser et al. | 264/40.5 |
| 4,066,725 | 1/1978 | Boettner | 264/40.5 |
| 4,135,873 | 1/1979 | Sone et al. | 425/145 |
| 4,302,411 | 11/1981 | Nakagawa et al. | 264/107 |
| 4,364,878 | 12/1982 | Laliberte | 264/328.7 |
| 4,414,167 | 11/1983 | Prusak et al. | 264/40.5 |
| 4,457,072 | 7/1984 | Andersen | 33/143 |
| 4,489,033 | 12/1984 | Uda et al. | 264/328.7 |
| 4,531,901 | 7/1985 | Andersen | 425/150 |
| 4,540,534 | 9/1985 | Grendol | 264/2.2 |
| 4,767,300 | 8/1988 | Buja et al. | 425/140 |
| 4,767,579 | 8/1988 | Buja et al. | 264/40.5 |
| 4,816,196 | 3/1989 | Otake | 264/40.1 |
| 4,816,197 | 3/1989 | Nunn | 264/40.6 |
| 4,863,651 | 9/1989 | Koten | 264/40.5 |
| 4,917,840 | 4/1990 | Harada et al. | 264/40.5 |

OTHER PUBLICATIONS

J. Greener, "Producing Precision Parts at Injection Speeds", Jun. 1987, pp. 43-46.

Primary Examiner—Jan H. Silbaugh
Assistant Examiner—Brian J. Eastley
Attorney, Agent, or Firm—Norman N. Spain

[57] ABSTRACT

An apparatus and method for controlling an injection molding device having a mold cavity therein use of periodically generated signals representative of the mold cavity pressure and mold cavity volume. These signals are used to control the magnitude of the clamping force imposed on a movable mold member. During a first time period following closure of the gate, in response to the signals representative of cavity pressure and cavity volume, the clamping force imposed on the movable mold member is adjusted to maintain, in closed loop fashion, cavity pressure constant. During a second time period following closure of the gate, in response to the signal representative of the cavity volume, the clamping force imposed on the movable mold member is adjusted to maintain, in closed loop fashion, cavity volume constant.

4 Claims, 8 Drawing Sheets

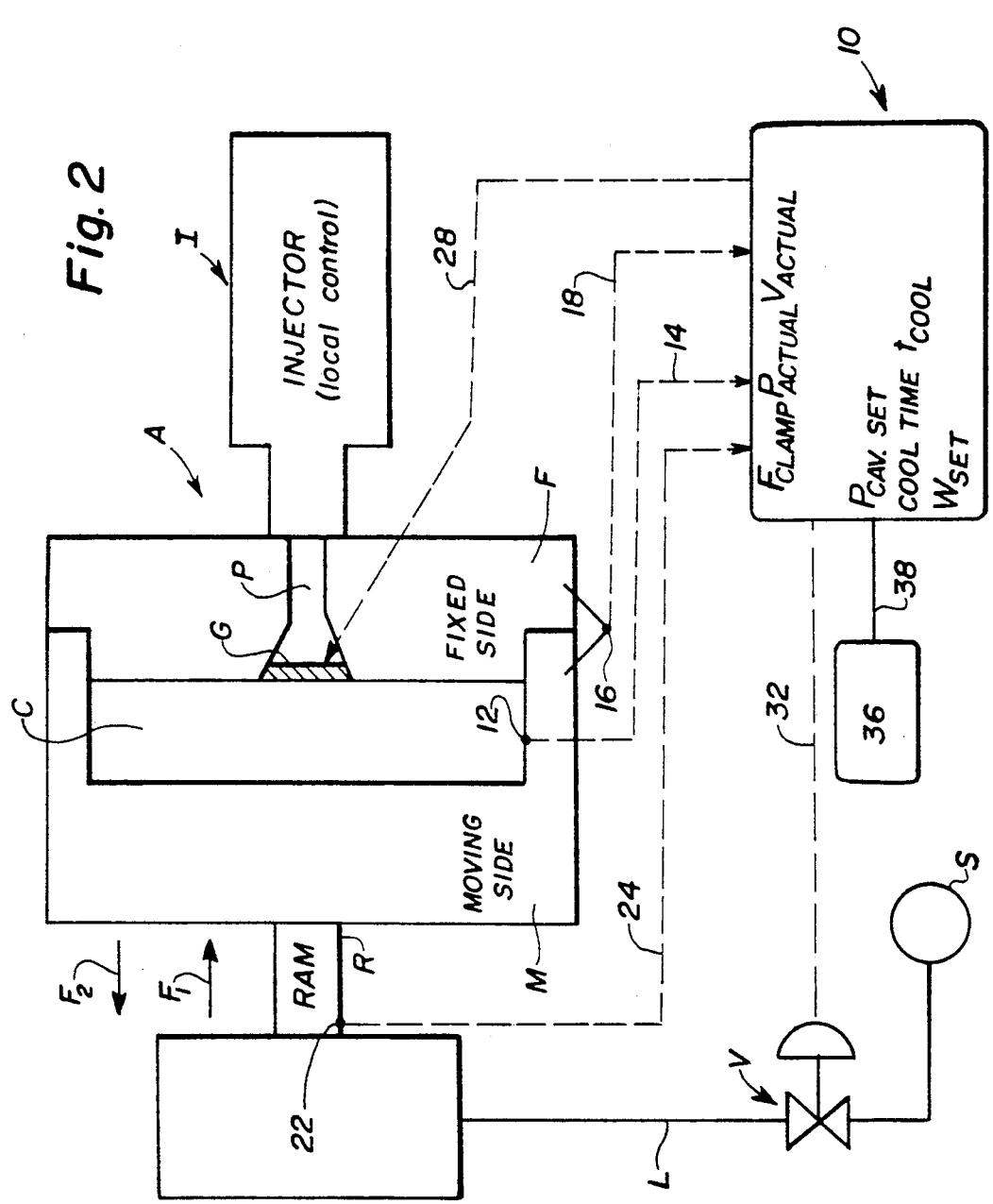

CONTROLLER SETPOINT DETERMINATION

MOLD CLOSURE
$P_{actual} = 0$ $F_{clamp} = F_o$

PRIOR TO INJECTION $V_{actual} = V_{min}$

END OF INJECTION
$P_{actual} = P_{cav\ set}$ $F_{clamp} = F_o$

END OF INJECTION (under local control)

$V_{actual} = V_{max}$

APPARATUS AND METHOD FOR CONTROLLING AN INJECTION MOLDING PROCESS PRODUCING A MOLDED PART

This is a continuation of application Ser. No. 07/447,982 filed Dec. 8, 1989, now abandoned.

BACKGROUND OF THE INVENTION

1. Field of the Invention

The present invention relates to an apparatus and method for controlling an injection molding device and, in particular, to an apparatus and method for controlling an injection molding device in a manner that results in the production of a molded part, such as a substrate for an optical medium, having substantially no residual stresses remaining therein.

2. Description of the Prior Art

An optical medium is a data storage element used to store recorded music, recorded video, and/or digital data. The medium comprises a thin, wafer-like substrate, or disc, coated with thin-film dielectric, magneto-optic and metallic reflective layers and a protective polymer overcoat. The substrate may be glass or may be formed by injection molding from a molten mixture of polymeric materials, such as a polycarbonate plastic material.

In order to be useful in certain applications, for example as an erasable (or "rewritable") optical storage medium, an injection molded part that forms the substrate of the medium must meet, at the minimum, ANSI functional specifications that mandate less than twenty nanometers (20 nm) retardation measured with a double pass, focused beam instrument. Lesser retardation levels, i.e., on the order of ten nanometers (10 nm) or less, measured with a double pass, linear polarization, focused beam instrument, are even more preferred, because of the concomitant increase in signal-to-noise ratio provided thereby. However, discs manufactured by an injection molding device controlled in accordance with known manufacturing schemes have average birefringence levels that are on the order of between thirty and thirty-five nanometers (30 to 35 nm). These levels of birefringence are believed due to the presence of residual stresses in the injection molded substrate.

The origin of these residual stresses may be understood when one considers the details of the fabrication of a substrate using a typical injection molding device. With reference to FIG. 1A, shown is a highly stylized representation of the major components of a conventional injection molding device generally indicated by the reference character A, presently used to fabricate, by injection molding, a substrate for an optical disc. Representative injection molding devices as shown in FIG. 1A include those manufactured by Technoplas Inc. and Klockner Ferromatik GmbH. These two-mentioned devices are in a class of injection molding devices which differ from other classes of injection molding devices because of the presence of a hydraulically operated, fully variable, clamping ram.

The injection molding device includes a fixed mold member F and a movable mold member M. The fixed mold member F has a material inlet passage P extending therethrough. The passage P may be interrupted by the insertion into the passage of a device known as a gate closure G. It should be understood that although the closure is shown throughout this application as implemented by a mechanical member, the gate closure can be alternatively implemented by presenting a constriction within the passage P.

The mold member M is moved with respect to the fixed member F by an actuating ram R. When acting in a first direction $F_1$ the ram R imposes a clamping force on the movable member that urges the members together whereby they cooperate to define a mold cavity C therebetween. In FIG. 1A the mold members M and F are shown in the clamped position, whereby the cavity C is defined. The volume of the cavity C is governed by the relative spacing between the mold members F and M. The action of the ram R in the opposite direction $F_2$ imposes an unclamping, or opening, force on the movable member, thereby causing the member M to separate from the member F to open the cavity C. Actuating hydraulic fluid is applied to the ram R from a pressurized fluid source S through a pressure line L. A control valve V is usually disposed in the line L. A molten mixture of polymeric material is supplied to the cavity C from the injector I, the material passing into the cavity C through the passage P in the fixed mold member F.

The conventional injection molding cycle is divided into several separate phases: (1) filling; (2) packing; (3) holding; and (4) cooling. The overall molding cycle extends for a predetermined molding cycle time. The variations in cavity volume, cavity pressure, and the magnitude of the clamping force during the phases of the conventional molding cycle may be understood from FIG. 1B.

Filling is the rapid volumetric filling of the mold cavity C. During the filling operation the injector I fills the cavity by rapidly forcing molten polymeric material thereinto. From FIG. 1B it is seen that during the filling phase the cavity volume and the imposed clamp force are both constant, but the cavity pressure rapidly increases. Packing is the slow pressure driven flow of molten polymeric material into the mold cavity C to insure complete filling thereof. During the packing phase the cavity volume, the imposed clamping force and the cavity pressure all remain substantially constant.

During the holding phase the molten polymeric material in the cavity C begins to cool, and continued slow pressure driven flow of molten polymeric material into the mold cavity compensates for the cavity volume reduction due to shrinkage. The holding phase continues until the gate G is closed or frozen, thus blocking the passage P from the injector I and thereby isolating the cavity C therefrom. During the cooling phase no further molten polymeric material can enter the cavity, and the part in the cavity C cools and continues to shrink. This shrinkage accounts for the decrease in the cavity pressure during the cooling phase, as seen in FIG. 1B. The cooling phase continues until the end of the predetermined molding cycle time, when the opening force is applied to the movable mold member M and the mold is opened. Using the conventional procedure as here outlined produces frozen-in residual stresses. If the part is used as a substrate for an optical disc, the frozen-in residual stresses create an unacceptably high level of birefringence in the finished disc.

An alternative molding control is shown in the dashed portion of the cavity-volume curve in FIG. 1B. In this alternate molding control method the molten polymeric material is initially injected into the mold cavity C at an injection pressure (not specifically illustrated in FIG. 1B) that exerts a force on the movable mold member M that is greater than the clamp force. This causes the movable mold member M to open during the filling and the early portion of the packing operations (thus the reason for the increase in cavity volume). This opening of the mold is termed "breathing" of the mold. As the injection pressure is decreased, the cavity volume returns to its original volume.

An alternative molding control method is discussed in the article by J. Greener, "Producing Precision Parts at Injection Speeds", Plastics Engineering, June 1987. This method is termed "hybrid molding" and the variations in cavity pressure, cavity volume and clamp force during the molding time cycle using such a method are shown in FIG. 1C. In this method the clamp force also remains fixed throughout the cycle. The introduction of molten material from the injector (at an injection pressure that initially exerts a force on the movable mold member M that is greater than the clamp force) causes the cavity volume and the cavity pressure to increase. The gate G is then mechanically closed or frozen. As the part cools, the clamp force remains constant and the cavity volume decreases as shrinkage occurs. Since cavity pressure is not measured and controlled, it is erratic. Erratic cavity pressure may be due to undetected disturbances in the systems, for example, frictional variations in the mold and the clamping system, changes in the hydraulic system supplying the ram and creating the clamp force, and variations in the physical properties of the polymeric material being molded. This causes variations in the resultant molded parts. This method, while an improvement over the two previously described methods (FIG. 1B), still produces parts that are unsatisfactory for precision optical media substrates.

In view of the foregoing it is believed advantageous to provide a controller apparatus and a method for controlling the operation of an injection molding device that results in the production of molded parts having lesser residual stresses and lesser birefringence.

SUMMARY OF THE INVENTION

The present invention relates to an apparatus and method for controlling an injection molding device of the type having a fixed and a movable mold member. The mold members are cooperable to define a mold cavity therebetween. A passage extends through one of the mold members through which a molten polymeric material may be introduced from an injector into the mold cavity. A gate, or other suitable mechanical expedient is provided to isolate the injector from the mold cavity. Means is provided for imposing an adjustable clamping force on the movable mold member.

In accordance with the present invention, once the gate is closed to isolate the mold cavity from the injector, signals representative of the mold cavity pressure and mold cavity volume are periodically generated and used to control the magnitude of the clamping force imposed on the movable mold member. During a first time period following closure of the gate the controller is responsive to the cavity pressure and the cavity volume signals to adjust the clamping force imposed on the movable mold member to maintain, in closed loop fashion, cavity pressure constant. During a second time period following closure of the gate the controller is responsive to the signal representative of the cavity volume to adjust the clamping force imposed on the movable mold member to maintain, in closed loop fashion, cavity volume constant. As a result of the present invention parts are produced that have substantially no residual stresses remaining therein.

BRIEF DESCRIPTION OF THE DRAWINGS

The invention will be more fully understood from the following detailed description, taken in connection with the accompanying drawings, which form a part of this application and in which:

FIG. 2 is a highly stylized representation, similar to FIG. 1A, illustrating a controller in accordance with the present invention and the interconnection thereof with the major components of an injection molding device;

DETAILED DESCRIPTION OF THE INVENTION

Figure 1A:
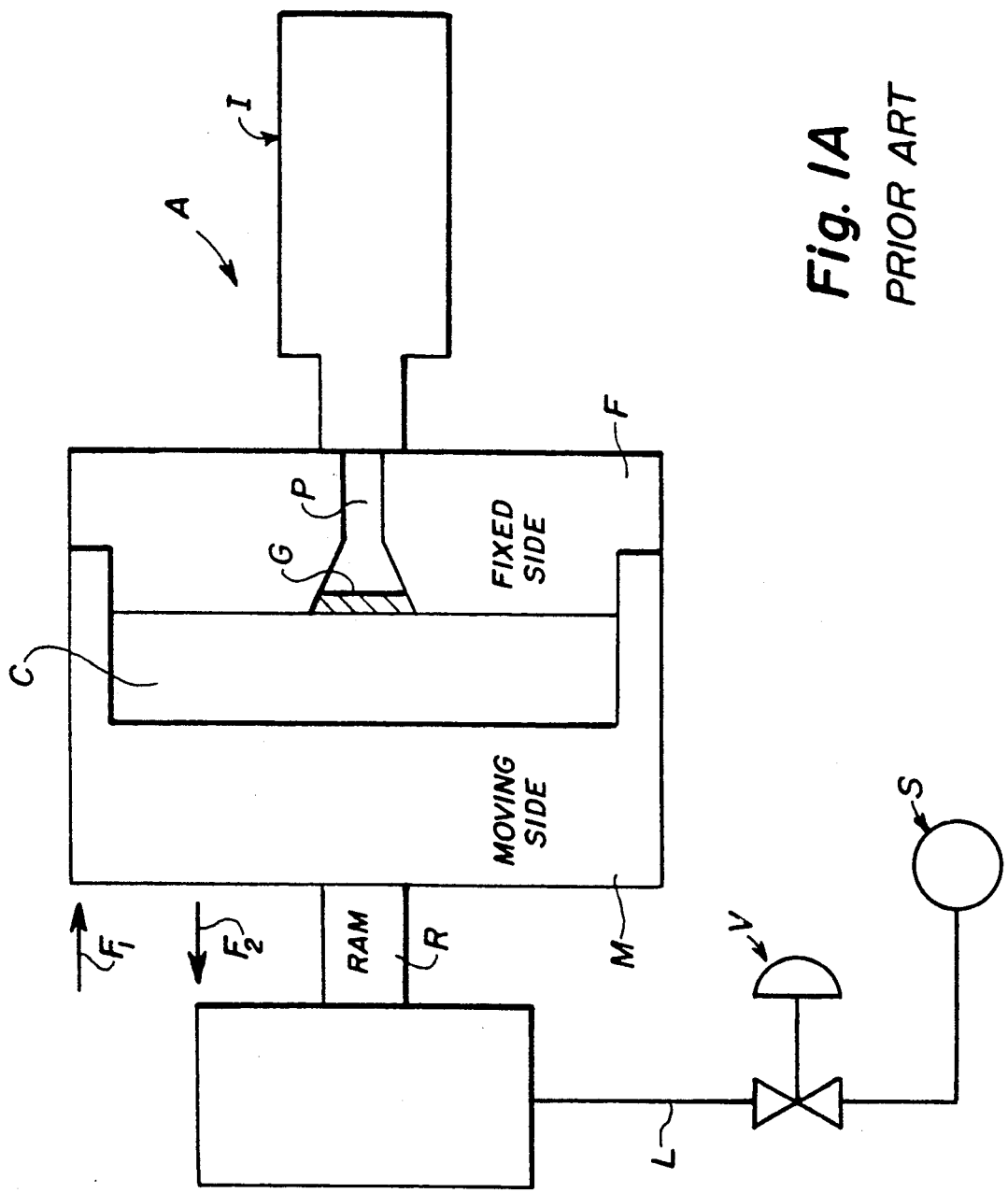
FIG. 1A is a highly stylized representation of the major components of a prior art injection molding device.
Figure 1B:
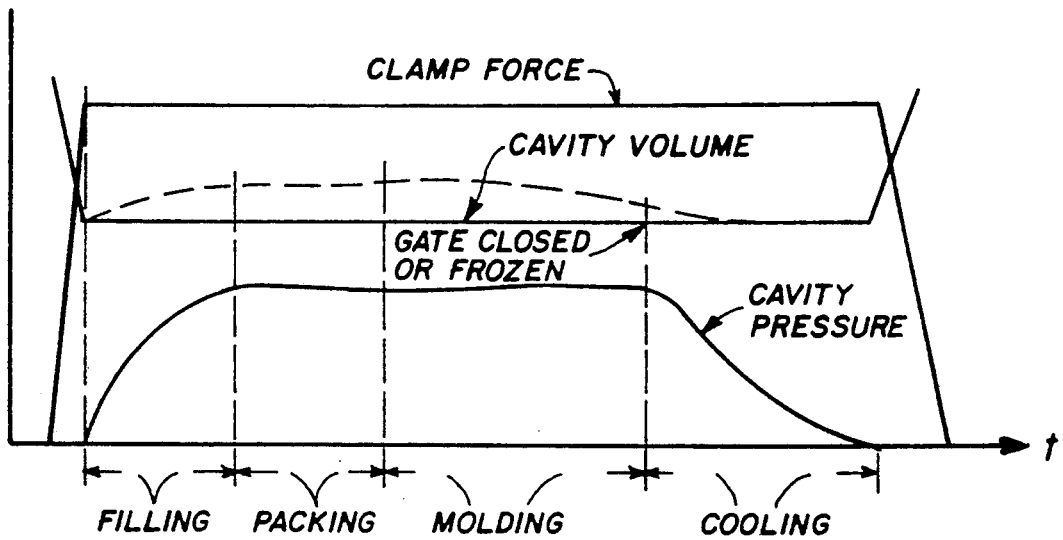
FIGS. 1B and 1C are graphical representations of the variations in mold cavity pressure, mold cavity volume, and clamp force, all shown over time, for three known prior art injection molding control schemes.
Figure 1C:
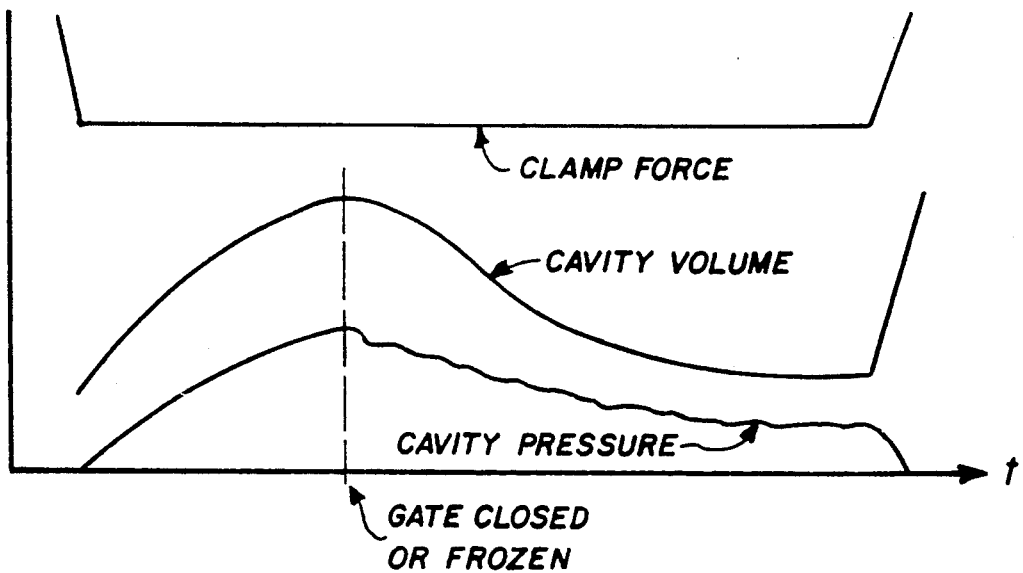

Throughout the following detailed description, similar reference numerals refer to similar elements in all figures of the drawings.

In FIG. 2 shown is a highly stylized representation, similar to FIG. 1A, of the major components of a conventional injection molding device A. Associated with the device A is a control apparatus, generally indicated by reference character 10, in accordance with the present invention. A pressure transducer 12 is mounted in any convenient location on the molding device A and is operative to provide to the controller 10 a signal representative of the actual pressure $P_{actual}$ of the mold cavity C. The actual pressure $P_{actual}$ signal is carried over an input line 14.

Similarly, the controller 10 receives, over an input line 18, information representative of the relative spacing of the fixed member F and the movable member M from a transducer 16. The transducer 16 is mounted to the device A in any convenient location thereon. The information on the line 18 is used to provide a representation of the actual volume $V_{actual}$ of the mold cavity C. Any suitable position transducer may be used to provide the signal on the line 18.

The controller 10 also receives information from a force transducer 22 disposed in a location of the device A suitable to monitor the clamp force $F_{clamp}$ imposed by the ram R on the movable member M. The clamp force information is applied to the controller 10 over an input line 24.

It should be understood from the foregoing that any suitable portions of the device A may be appropriately monitored so long as signals representative of the actual pressure $P_{cavity}$ of the mold cavity C, the actual volume $V_{cavity}$ of the mold cavity C, and the clamp force $F_{clamp}$ imposed by the ram R are provided to the controller 10.

The controller 10 outputs a gate control signal over an output line 28. When asserted, the gate control signal on the line 28 is operative to close the gate G and thereby block the flow of molten polymeric material through the passage P and thus isolate the cavity C from the injector I. In practice the gate control signal may be applied to a hydraulic piston (not shown) which sends a ram through the cavity C that seats into the passage P, thereby closing the same. Another output line 32 from the controller 10 controls the operation of the valve V and thereby serves to control the magnitude of the clamping force $F_{clamp}$ imposed by the ram R on the movable member M.

In addition, an operator control pad 36 provides an interface through which an operator of the molding apparatus A may input to the controller 10, over an input line 38, operator selected information regarding the desired cavity pressure $P_{cav\ set}$, the desired weight $W_{set}$ of the part being molded, and the cool time $t_{cool}$.

The control apparatus 10 may be implemented using a general purpose digital computer operated in accordance with a program. Preferably, the controller 10 is implemented using a MicroVax II manufactured and sold by Digital Equipment Corporation. To be useful with presently available injection molding device, the control apparatus 10 must be capable of performing sampling operations, data acquisition operations and computational operations within at most ten milliseconds (10 msec). Since these operational rates surpass those available on commercial molding machines (even those specifically designed for the optical disc substrate market), incorporation of a dedicated input/output controller such as provided in the MicroVax II computer is required. The ten millisecond limit is derived from the minimum control action required to implement the injection molding control in accordance with the present invention. Alternatively, (assuming that the requisite rates for sampling operations, data acquisition operations and computational operations are met), it should be understood that the controller may be otherwise implemented using any other suitable programmable device, or may be implemented in hardware form using discrete components and/or integrated circuits.

With reference now to FIGS. 3, 4, 5A through 5E, and 6 the operation of an apparatus and method for controlling in closed loop fashion an injection molding device A in accordance with the present invention may be understood.

Figure 3:
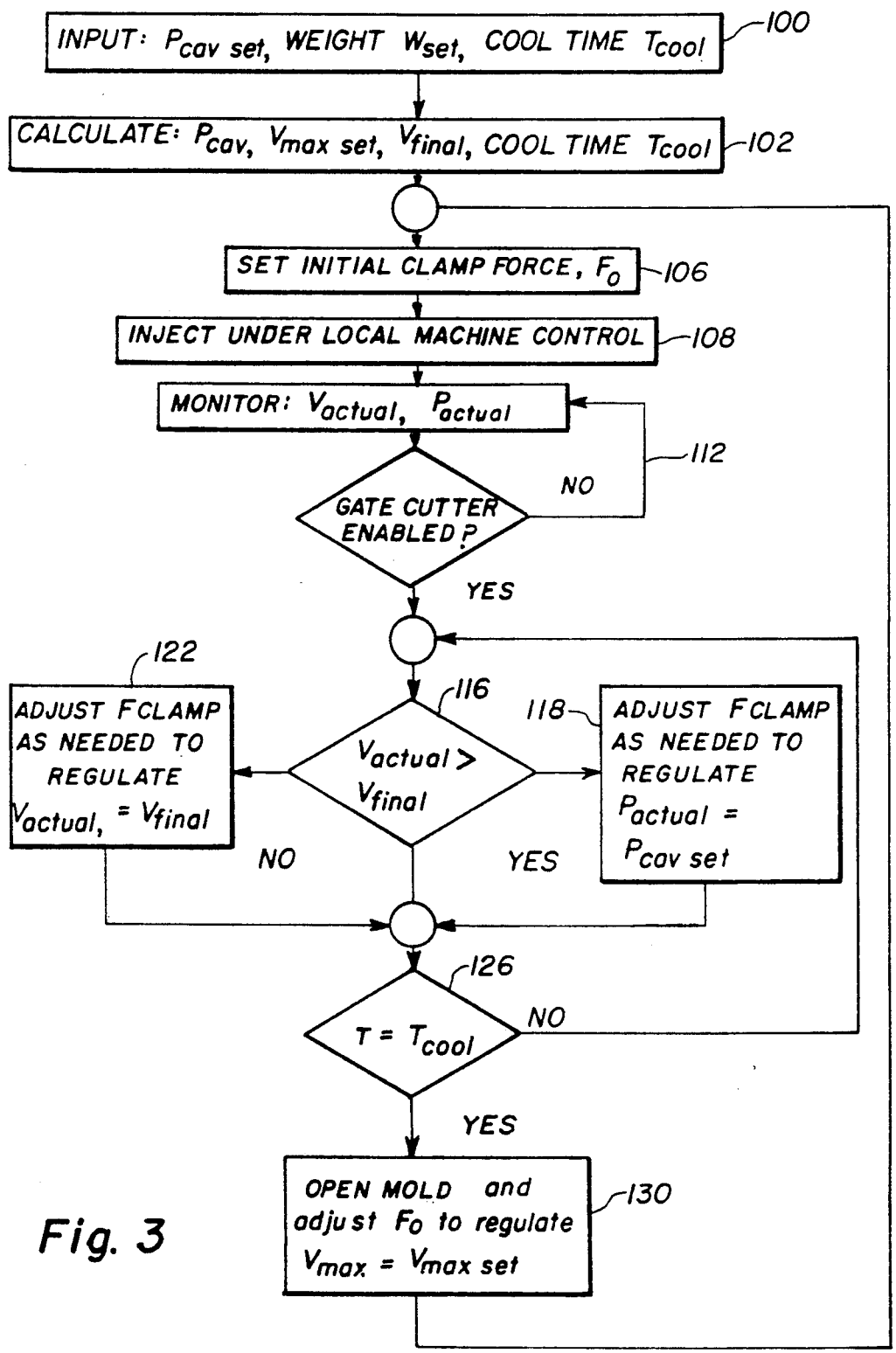
FIG. 3 is a flow diagram of the closed loop control sequence of a controller for controlling the operation of an injection molding device in accordance with the present invention.
Figure 4:
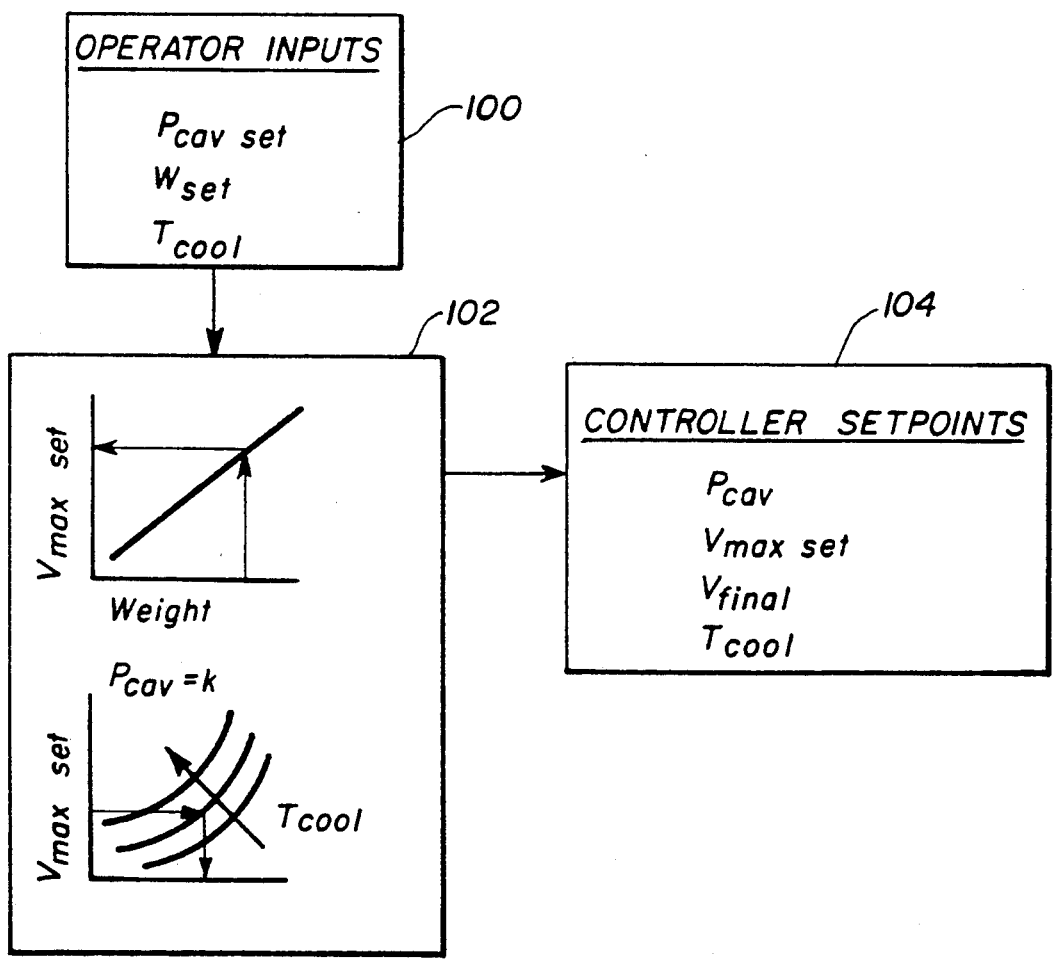
FIG. 4 is a more detailed flow diagram of the set point calculation effected by the controller in accordance with the present invention.

As is best seen from steps 100, 102 of the overall flow diagram of FIG. 3, and the more detailed flow diagram of FIG. 4, an operator, using the control interface 36, selects and inputs to the controller 10 the desired cavity pressure $P_{cav\ set}$, the desired weight $W_{set}$ of the part being molded, and the cool time $t_{cool}$ for the molding process being controlled. From this input information the controller 10, as indicated in block 102, is operative to generate the complete set 104 (FIG. 4) of controller setpoints. These controller setpoints specify the molding process, namely, cavity pressure $P_{cav}$, the maximum cavity volume $V_{max\ set}$, the final cavity volume $V_{final}$, and the cooling time $t_{cool}$. As is seen from FIG. 4 the derivation of these controller setpoints is made from stored information produced empirically (or in the case of time $t_{cool}$, received from the operator). The two relationships in the enlarged block 102 in FIG. 4 refer to a molding apparatus-dependent relationship between Weight and $V_{max\ set}$ and a material-dependent relationship between $P_{cav}$, $t_{cool}$, $V_{max\ set}$ and $V_{final}$. This material-dependent relationship is derived from the characteristic equation of state of the polymeric material being molded.

Figure 5A:
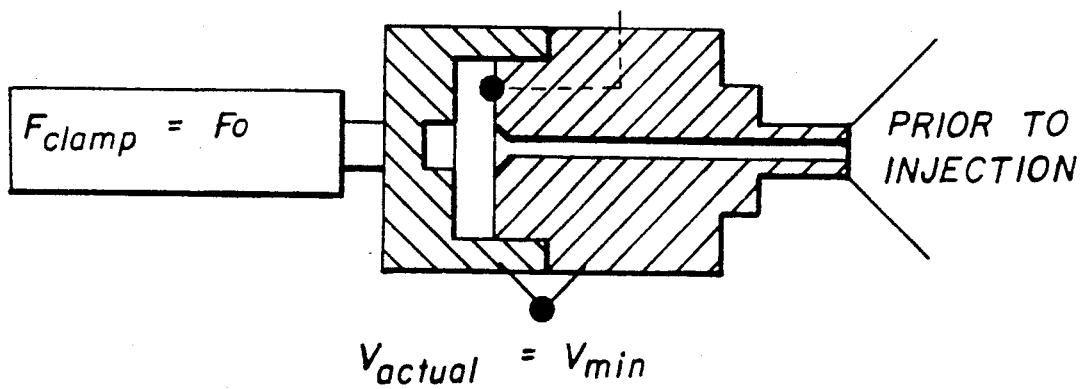
FIGS. 5A though 5E are stylized schematic representations of the injection molding device at various positions throughout the control sequence effected by the controller of the present invention.

As seen from block 106 (FIG. 3) the controller 10 responds to these calculated controller setpoints and outputs a control signal over the line 32 to impose an initial clamp force $F_0$ on the movable member M. In response to the imposition of the initial clamp force $F_0$ the volume of the mold cavity C is reduced to its minimum value $V_{min}$. This condition of the molding device is shown in FIG. 5A.

Figure 5B:
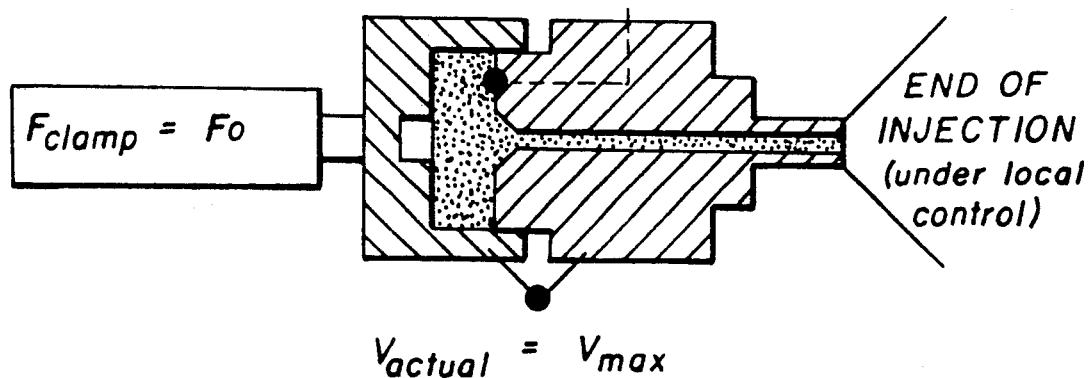

As seen in FIG. 5B the injector I, operating under its own local control program, thereafter begins the introduction of the molten polymeric material into the cavity C. The injector I fills the mold cavity according to a predetermined pressure versus time curve resident in the local control program.

In the loop 112 (FIG. 3), the controller 10 periodically samples the signal on the line 14 representative of the cavity volume $V_{actual}$ and the signal on the line 18 representative of the cavity pressure $P_{actual}$. The condition of the molding device just prior to the complete filling of the mold cavity is shown in FIG. 5B.

Figure 5C:
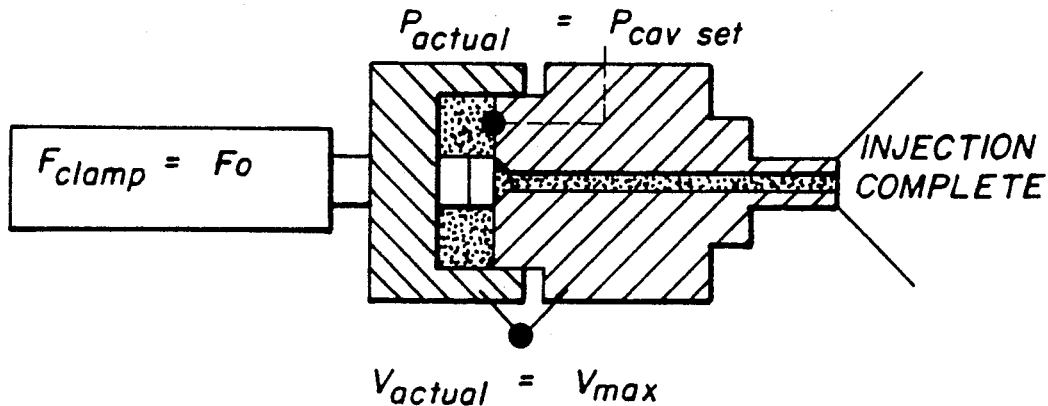

When the signal representative of the actual cavity volume $V_{actual}$ is equal to the controller setpoint $V_{max\ set}$, and the signal representative of the actual cavity pressure $P_{actual}$ is equal to the controller setpoint $P_{cav}$, the controller outputs an enabling signal to the gate G on the output line 28. This action, in practical implementation energizes the hydraulic piston which seats the ram into the passage P, effectively isolating the cavity C from the injector I. This condition of the molding device is shown in FIG. 5C. It is noted that the molten polymeric material trapped in the passage P is not permitted to enter the cavity C. Conversely, the material then-present in the cavity C is not permitted to leave through the passage P. $V_{max\ set}$ is sized such that the total required mass for the part being molded is present in the cavity when the gate G is closed. Also note that in accordance with this invention there is no packing phase. The value of the measured volume $V_{actual}$ when the gate G is closed is stored in the controller 10 as $V_{max}$. It should be noted that the isolation of the cavity C from the injector I may be effected by permitting the polymeric material in the gate G to freeze rather than affirmatively sealing the passage with a mechanical gate closure, as discussed above.

Figure 5D:
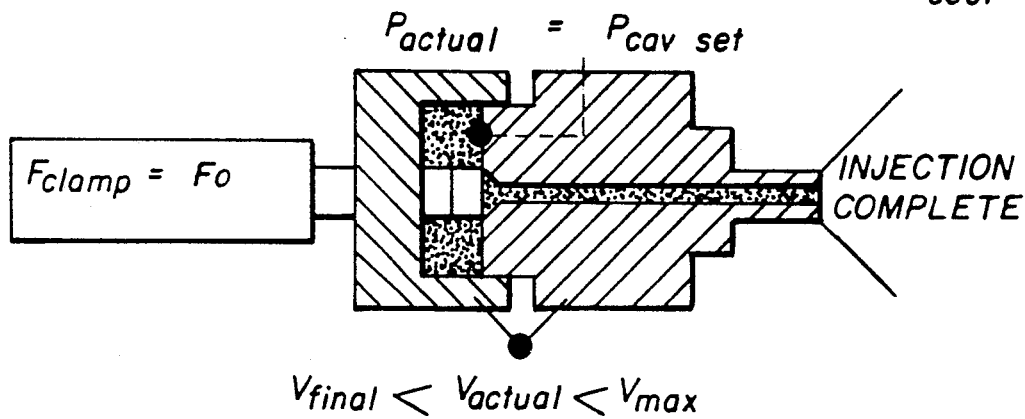

The cooling phase then begins. As may be best appreciated from FIG. 6, during a first portion $t_{cool-1}$ of the cooling phase the controller samples the signals representative of the actual cavity volume $V_{actual}$ and the actual cavity pressure $P_{actual}$. So long as the actual cavity volume $V_{actual}$ is greater than the controller setpoint $V_{final}$, the clamp force $F_{clamp}$ is regulated as required to maintain, in closed loop fashion, the actual cavity pressure $P_{actual}$ at a constant value equal to the controller setpoint $P_{cav}$. This is accomplished by manipulating valve V over the control line 32 in accordance with a control algorithm. Although any suitable control algorithm may be used, a proportional integral control algorithm is preferred. This portion of the control scheme is shown by the decision block 116 and the control block 118. This condition of the molding device is shown in FIG. 5D.

Figure 5E:
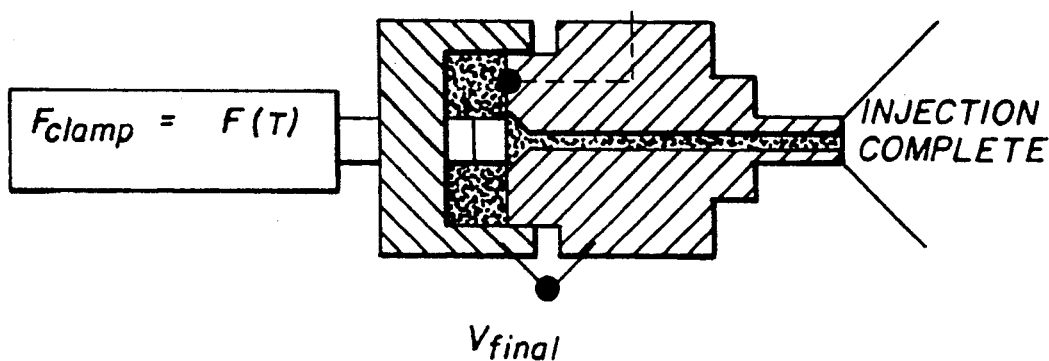
Figure 6:
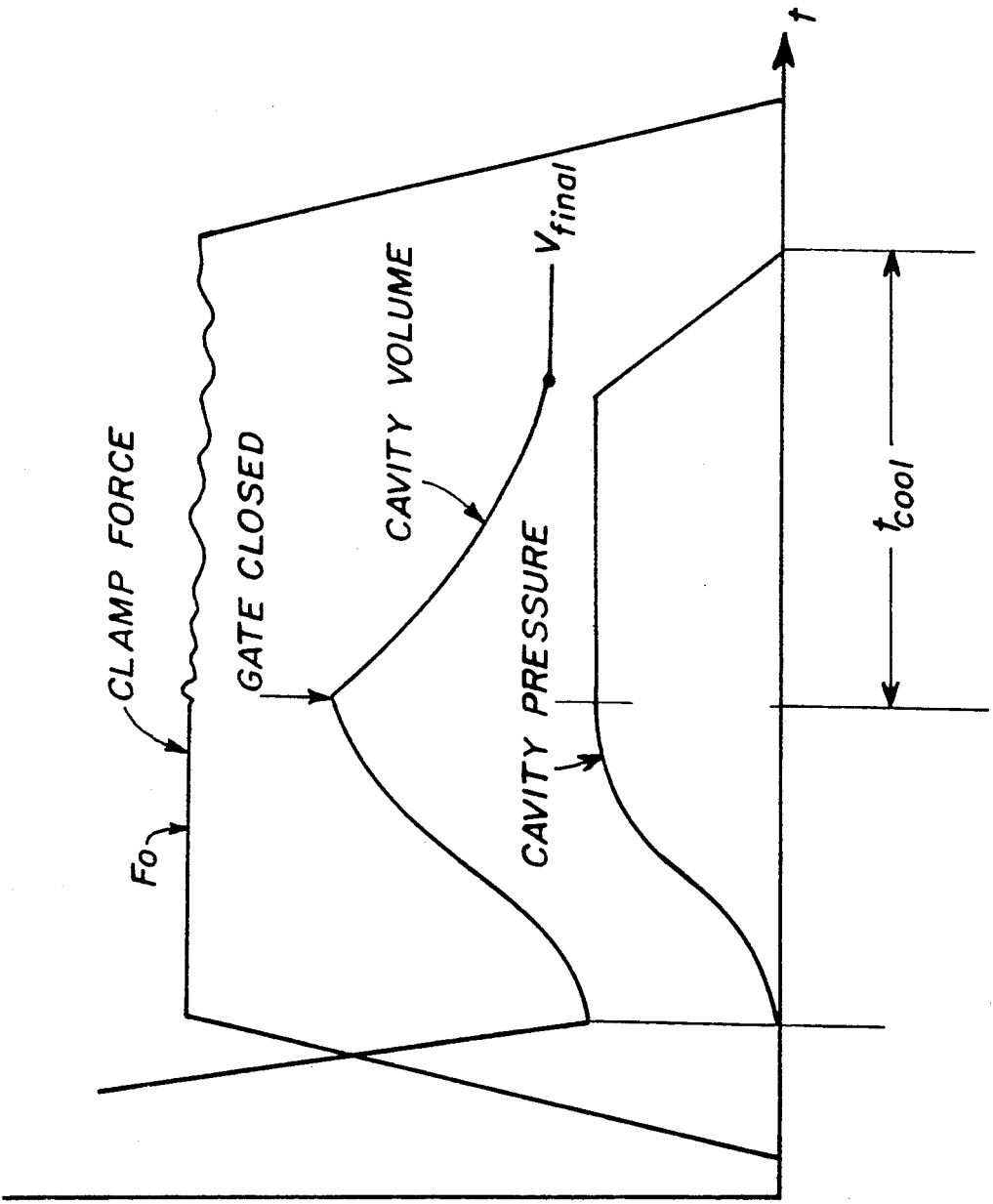
FIG. 6 is graphical representation, similar to FIGS. 1B and 1C, of the variations in mold cavity pressure, mold cavity volume, and clamping force, all shown over time, using the control apparatus and method of the present invention.

When the actual cavity volume $V_{actual}$ is equal to the controller setpoint $V_{final}$, a second portion $t_{cool-2}$ of the cooling phase begins. During the second cooling phase, the controller, in response to the signal representative of the volume of the cavity, regulates the clamp force as required to maintain, in closed loop fashion, the actual cavity volume $V_{actual}$ at a constant value equal to the controller setpoint $V_{final}$. This portion of the control scheme is shown by the decision block 116 and the control block 122 in accordance with a control algorithm. Similarly, although any suitable control algorithm can be used, a proportional integral control algorithm is preferred. This control action continues until the sum of the elapsed times $t_{cool-1}$ and $t_{cool-2}$ equals the controller setpoint $t_{cool}$. This portion of the control scheme is shown by the decision block 126. This condition of the molding device is shown in FIG. 5E.

When the part cooling time $t_{cool}$ is reached, as seen at the affirmative output of the decision block 126, the mold is opened, as illustrated at the block 130. The block also calculates an updated controller setpoint $V_{max\ set}$ based on the measured value $V_{max}$.

Those skilled in the art, having the benefit of the teachings of the present invention as hereinabove set forth, may effect numerous modifications thereto. Such modifications are to be construed to lie within the contemplation of the present invention, as defined by the appended claims.

What is claimed is:

1. A method for controlling, in closed loop fashion, an injection molding device of the type having a fixed and a movable mold member, the mold members cooperating to define a mold cavity therebetween, a passage extending through one of the mold members through which a molten polymeric material may be introduced into the mold cavity, and clamping means for imposing a clamp force on the movable mold member, the method comprising the steps of:

a) specifying a predetermined final cavity volume ($V_{final}$) and generating signals representative of mold cavity pressure and volume to be used by a controller responsive to said signals to vary the clamp force imposed on the movable mold member;

b) actuating the clamping means to impose a predetermined initial clamp force ($F_O$) on the movable mold member to define a mold cavity between the movable and the fixed mold members having a predetermined initial volume ($V_{min}$) therein;

c) introducing a molten polymeric material into the mold cavity to cause the cavity to expand to a predetermined second volume ($V_{max}$) at a predetermined cavity pressure ($P_{cav\ set}$), the predetermined second volume ($V_{max}$) exceeding the predetermined initial volume ($V_{min}$);

d) blocking the passage into the mold cavity when said signals indicate that the volume of the mold cavity has expanded to the predetermined second volume ($V_{max}$);

e) during a first time period $t_{cool-1}$ following the blocking of the passage actuating the clamping means to vary the clamp force imposed on the movable mold member to maintain the pressure in the cavity at the predetermined cavity pressure value ($P_{cav\ set}$) until the volume of the cavity is reduced to a third volume ($V_{final}$) in accordance with the contraction of the material therein, the third volume ($V_{final}$) being a predetermined volume that is less than the second volume ($V_{max}$) and greater than or equal to the first volume ($V_{min}$);

f) during a second time period ($t_{cool-2}$) actuating the clamping means with the controller responsive to said signals to vary the clamp force imposed on the movable mold member to maintain constant the third volume ($V_{final}$) in the cavity until the expiration of the second time period; and g) actuating the clamping means to impose a predetermined force acting in an opening direction on the movable mold member to separate the mold members to a position sufficient to permit access to the cavity to remove any cured polymeric material therein.

2. The method of claim 1 wherein the weight of the cured material is functionally related to the second volume ($V_{max}$).

3. A method for controlling, in closed loop fashion, an injection molding device of the type having a fixed and movable mold member, the mold members cooperating to define a mold cavity therebetween, a passage extending through one of the mold members through which a molten polymeric material may be introduced into the mold cavity, and clamping means for imposing a clamp force on the movable mold member, the method comprising the steps of:

a) specifying a predetermined final cavity volume V final and generating signals representative of mold cavity pressure and volume to be used by a controller responsive to said signals to vary the clamp force imposed on the movable mold member;

b) actuating the clamping means to impose a predetermined initial clamp force ($F_O$) on the movable mold member to define a mold cavity between the movable and the fixed mold members having a predetermined initial volume ($V_{min}$) therein;

c) introducing a molten polymeric material into the mold cavity to cause the cavity to expand to a predetermined second volume ($V_{max}$) at a predetermined cavity pressure ($P_{cav\ set}$), the predetermined second volume ($V_{max}$) exceeding the predetermined initial volume ($V_{min}$);

d) blocking the passage into the mold cavity when said signals indicate that the volume of the mold cavity has expanded to the predetermined second volume ($V_{max}$);

e) during a first time period $t_{cool-1}$ following the blocking of the passage, actuating the clamping means to vary the clamp force imposed on the movable mold member to maintain the pressure in the cavity at the predetermined cavity pressure value ($P_{cav\ set}$) until the volume of the cavity is reduced to a third volume ($V_{final}$) in accordance with the contraction of the material therein, the third volume ($V_{final}$) being a predetermined volume that is less than the second volume ($V_{max}$) and greater than or equal to the first volume ($V_{min}$);

f) during a second time period ($t_{cool-2}$) actuating the clamping means with the controller responsive to said signals to vary the clamp force imposed on the movable mold member to maintain constant the third volume ($V_{final}$) in the cavity until the expiration of the second time period;

g) actuating the clamping means to impose a predetermined force acting in an opening direction on the movable mold member to separate the mold members to a position sufficient to permit access to the cavity to remove any cured polymeric material therein; and h) sizing the second volume (Vmax) to regulate the weight of subsequently cured material.

4. Apparatus for controlling an injection molding device of the type having a fixed and a movable mold member, the mold members cooperating to define a mold cavity therebetween, a passage extending through one of the mold members through which a molten polymeric material may be introduced into the mold cavity, means for blocking the passage, and clamping means for imposing a variable clamp force on the movable mold member, comprising:

means for specifying a predetermined final cavity volume $V_{final}$;

means for generating a signal representative of the volume of the cavity;

means for generating a signal representative of the pressure of the cavity;

a closed loop controller responsive to the signals representative of the volume of the mold cavity to block the passage into the mold cavity when the volume of the mold cavity expands to a predetermined volume ($V_{max}$) and the actual cavity pressure reaches a predetermined cavity pressure ($P_{cav\ set}$) following the introduction of a polymeric material thereinto, the controller being further responsive during a first time period ($t_{cool-1}$) following the isolation of the cavity to the signals representative of the volume and the pressure of the cavity to vary the clamp force imposed on the movable mold member to maintain the pressure in the cavity at the predetermined cavity pressure value ($P_{cav\ set}$) as the volume of the cavity is reduced to a lesser predetermined volume ($V_{final}$) in accordance with the contraction of the material therein, the third volume ($V_{final}$) being a predetermined volume that is less than the second volume ($V_{max}$) and greater than or equal to the first volume ($V_{min}$), the controller being still further responsive during a subsequent second time period ($t_{cool-2}$) to the signal representative of the volume of the cavity to vary the clamp force imposed on the movable mold member to maintain constant the cavity volume at the lesser volume ($V_{final}$) until the expiration of the second time period.

* * * * *